United States Patent [19]
Ponticelli, Jr. et al.

[11] Patent Number: 5,441,421
[45] Date of Patent: Aug. 15, 1995

[54] ANTI-THEFT MOUNTING SYSTEM FOR VEHICLE RADIO OR STEREO EQUIPMENT

[75] Inventors: Pasco Ponticelli, Jr.; Robert J. Ponticelli, both of Camarillo; William C. Stevenson, Calabasas, all of Calif.

[73] Assignee: American International Pacific Industries Corporation, Camarillo, Calif.

[21] Appl. No.: 75,782

[22] Filed: Jun. 11, 1993

[51] Int. Cl.⁶ .............................................. H01R 13/60
[52] U.S. Cl. ..................................... 439/284; 439/297; 439/789
[58] Field of Search ............. 439/284, 297, 298, 377.2, 439/789, 441

[56] References Cited
U.S. PATENT DOCUMENTS

| | | | |
|---|---|---|---|
| 899,708 | 9/1908 | Ball | 439/789 X |
| 2,617,844 | 11/1952 | Sanda | 439/441 |
| 3,827,007 | 7/1974 | Fairbarn et al. | 439/293 |
| 3,846,735 | 11/1974 | Carter et al. | 439/284 |
| 4,084,876 | 4/1978 | Dinger | 439/439 |
| 4,168,879 | 9/1979 | Ohtsuki et al. | 439/862 |
| 4,462,564 | 7/1984 | Alves et al. | 248/27.1 |
| 4,555,080 | 11/1985 | Nara | 248/27.1 |
| 4,560,124 | 12/1985 | Alves et al. | 248/27.1 |
| 4,572,465 | 2/1986 | Rasca | 248/27.1 |
| 4,673,232 | 6/1976 | Kubota et al. | 439/441 |
| 4,710,136 | 12/1987 | Suzuki | 439/297 X |
| 4,726,789 | 2/1988 | Yaffe | 439/297 X |
| 4,768,976 | 9/1988 | Gelati | 439/441 |
| 4,978,315 | 12/1990 | Edgley et al. | 439/441 |
| 5,275,620 | 1/1994 | Darby et al. | 439/441 X |

FOREIGN PATENT DOCUMENTS 1403154  6/1988  U.S.S.R. .............. 439/789

Primary Examiner—Z. R. Bilinsky
Attorney, Agent, or Firm—Edward A. Sokolski

[57] ABSTRACT

An adapter having solderless wire terminals for receiving the wire leads from an electrical equipment such as a radio or stereo player set is installed on the back of such set. Such terminals have solderless spring connectors for the wire leads, these connectors employing a pair of opposing apertured fingers which overlap when manually urged together against the spring action to permit the insertion of a wire lead in the aperture thereof and to be retained therein by the spring action. The equipment or stereo set is removably installed in a mounting frame which is mounted in the vehicle. The mounting frame has a terminal therein which the terminal of the set matingly engages to provide electrical connections therebetween. The terminal of the mounting frame has solderless spring connectors similar to those of the terminal of the equipment, such connectors receiving the various wiring leads from the equipment to the power source, speakers, etc. The mounting frame has two sections which are adjustable to vary the depth thereof to accommodate equipments of various depths.

11 Claims, 5 Drawing Sheets

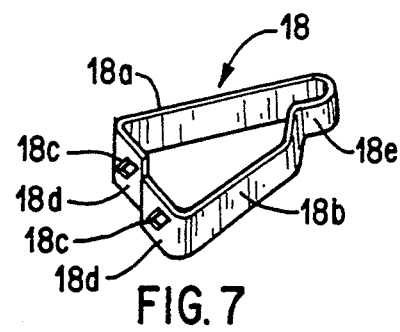
FIG. 7
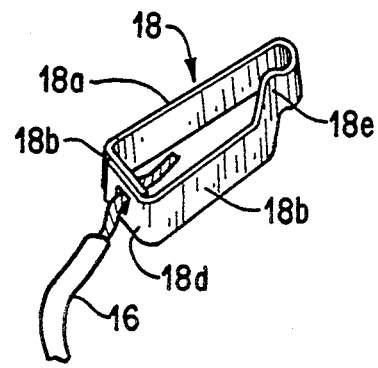
FIG. 7A
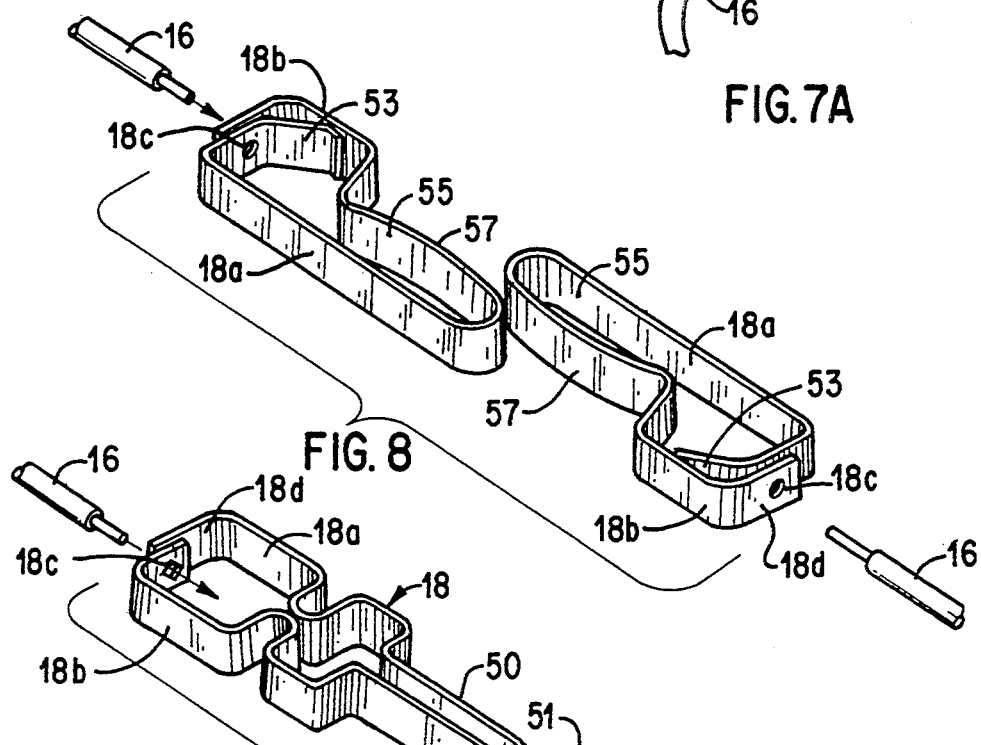
FIG. 8
FIG. 9
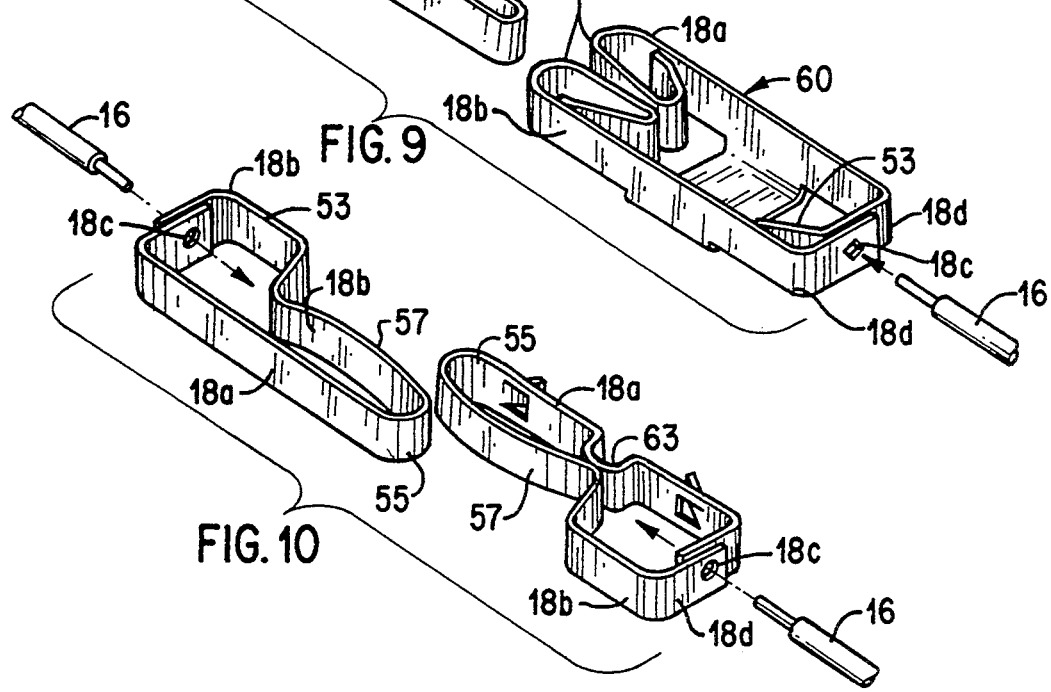
FIG. 10

ANTI-THEFT MOUNTING SYSTEM FOR VEHICLE RADIO OR STEREO EQUIPMENT

BACKGROUND OF THE INVENTION

1. Field of the Invention

This invention relates to the installation of an electrical equipment such as a radio or stereo player equipment in vehicles or boats and more particularly to a system for removably installing such equipment so that the equipment can readily be removed from the vehicle either to avoid theft or to enable the use of the same equipment in different vehicles.

2. Description of the Prior art

The theft of radio and stereo player equipment from vehicles presents an ongoing problem. Numerous alarm systems have been designed in the prior art to deter such theft, but one cannot be assured, even with the best alarm system, that a thief will still not be able to escape with the equipment. One way to avoid this problem is to remove the equipment from the dashboard when the vehicle is left unguarded and place such equipment in the vehicle trunk or other more secure place. Systems have been developed in the prior art along these lines but such systems are often difficult and time consuming to install or fail to provide firm retention of the equipment in the vehicle while at the same time permitting rapid and easy removal.

SUMMARY OF THE INVENTION

The system of the present invention utilizes an adapter having a solderless wire terminal mounted thereon, such adapter being attached to the rear of an electrical equipment such as a radio or stereo player to be installed in a vehicle. The wire terminal has a plurality of solderless spring connectors, each of such connectors having a pair of opposing finger portions with apertures therein. Such fingers are urged apart by the spring action of the connectors. When manually urged together against such spring action the fingers overlap so that their apertures can be brought into alignment with each other. Wire leads can then be inserted in the apertures and are retained therein when the connectors are released so that they are again urged apart by the spring action. The wire leads feeding into the equipment are attached to the connectors and such connectors selectively installed in the terminal.

The equipment is inserted into a mounting frame having two sections which is installed in the vehicle. The mounting frame has a solderless wire terminal installed in the back portion of the rear section thereof which matingly engages the wire terminal of the adapter attached to the equipment. The wire terminal of the mounting frame has solderless connectors similar to those of the equipment adapter wire terminal which are connected to the various input leads of the equipment, i.e. power leads, speaker leads, control leads, etc. These connectors are selectively installed in the mounting frame wire terminal to provide proper connections to the mating wire terminal of the equipment adapter. The two sections of the mounting frame are joined together along their opposite sides by a pair of spring fingers in one section which matingly engage teeth or apertured portions of a strip formed in the other section. A plurality of such apertures which are spaced apart linearly are provided so that the effective depth of the mounting frame can be adjusted to accommodate equipments having various depths. In its installed position, the equipment is removably retained to the mounting frame by means of a lever pivotally mounted on the front face of the equipment which engages a slot or slots forming a latching member on the mounting frame. The equipment can be removed merely by rotating the lever out of engagement with the latching member.

It is therefore an object of this invention to provide an installation system for vehicle and radio equipment in which such equipment can be readily removed to avoid theft thereof and just as readily reinstalled.

It is a further object of this invention to provide an anti-theft vehicle radio or stereo installation system which can be easily installed in an existing installation without the need for the soldering of the wire leads employed.

Other objects of the invention will become apparent from the following description taken in connection with the accompanying drawings.

DESCRIPTION OF THE DRAWINGS

FIG. 7 is a perspective view showing one of the solderless wire terminals of the preferred embodiment in an unactuated state and without a wire installed therein;

FIG. 7A is a perspective view showing one of the solderless wire terminals of the preferred embodiment with a wire lead installed therein;

FIG. 8 is an exploded perspective view illustrating another form of the solderless connectors of the invention;

FIG. 9 is an exploded perspective view of still another form of the solderless connectors of the invention; and FIG. 10 is an exploded perspective view of a still further form of the solderless connectors of the invention.

DETAILED DESCRIPTION OF THE INVENTION

Figure 5:
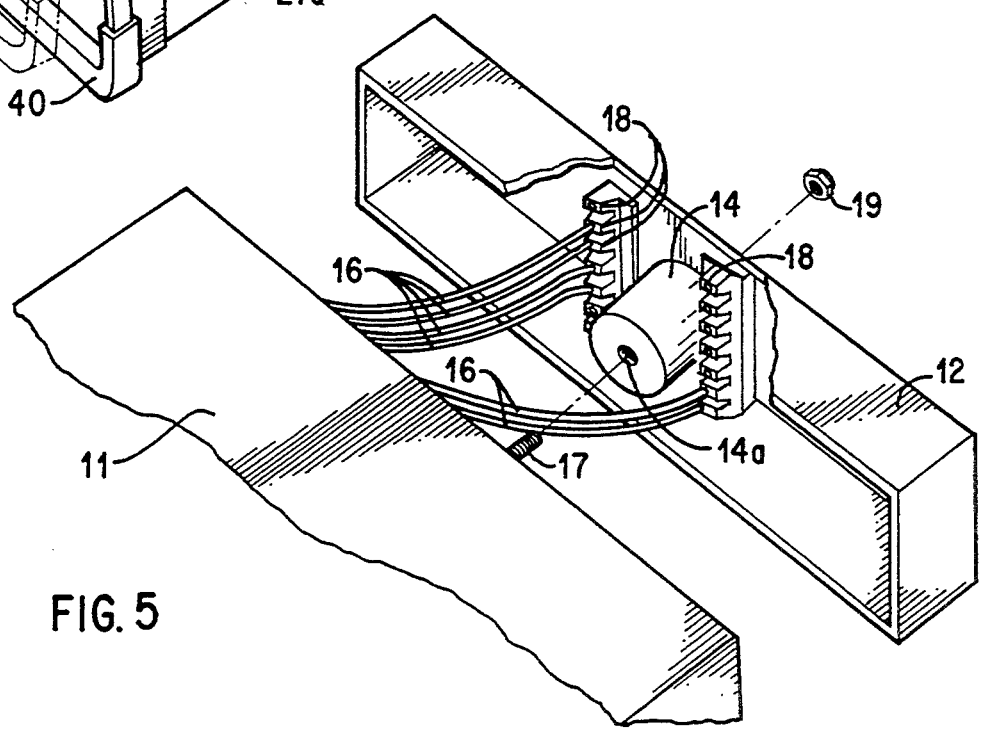
FIG. 5 is a top perspective view illustrating the attachment of the terminal adapter of the preferred embodiment to the equipment.
Figure 6:
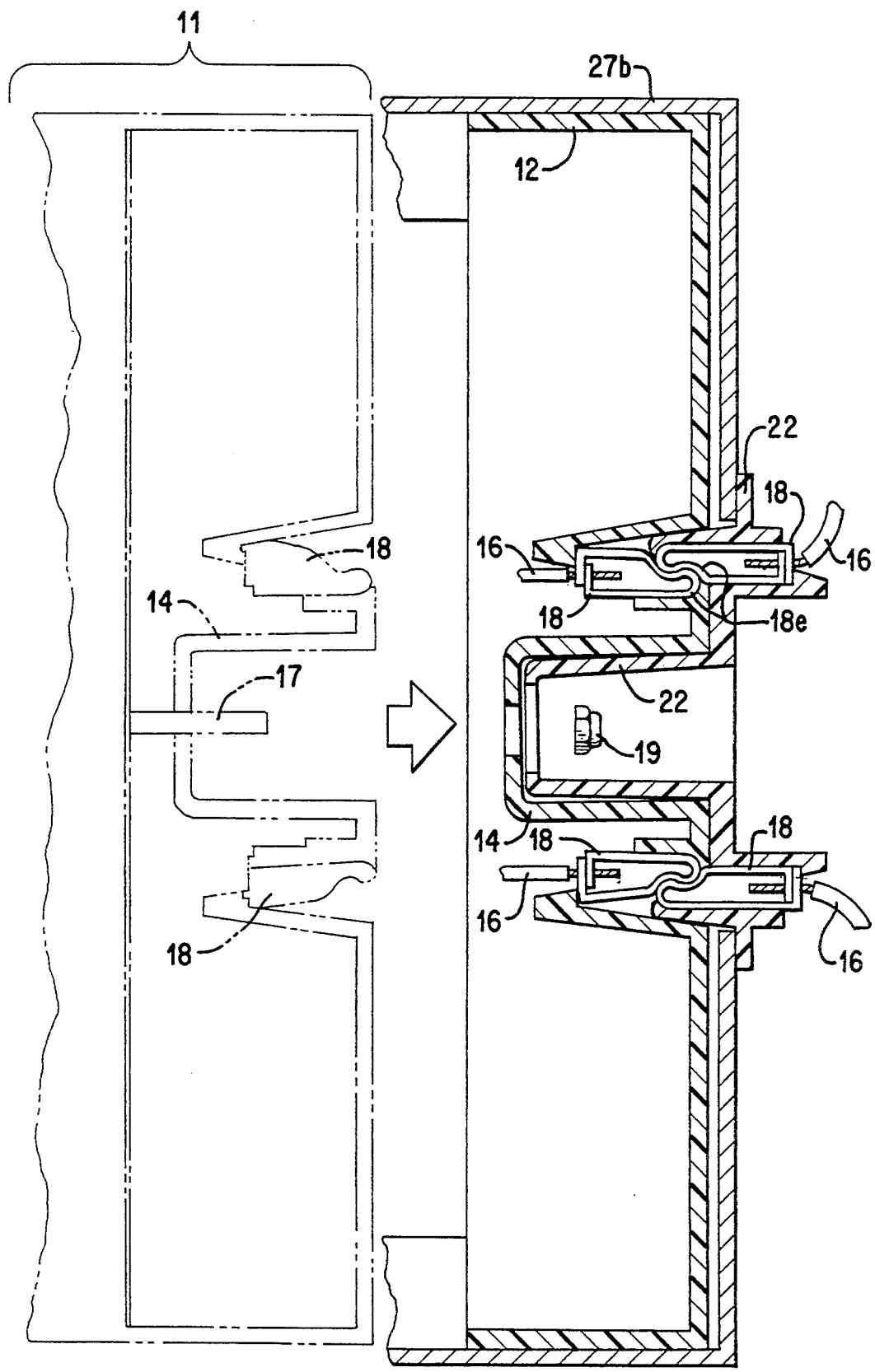
FIG. 6 is a cross sectional view illustrating the interconnections between the wire terminals and the spring connectors of the equipment and the mounting frame of the preferred embodiment.

Referring now to the FIGS, a preferred embodiment of the invention is illustrated. An equipment 11 which may be a radio, stereo player or similar such equipment has an adapter 12 with a wire terminal 14 therein. As can best be seen in FIG. 5, adapter 12 is attached to the rear of equipment 11 by means of a threaded bolt 17 which is attached to and protrudes from the equipment, this bolt being fitted through aperture 14a formed in terminal 14 and joined to the adapter by means of nut 19. The wiring leads 16 from the equipment for connecting power, speaker leads, etc. to the equipment are each connected to one of solderless connectors 18, as best can be seen in FIGS. 7 and 7a. Solderless spring connectors 18 each has a pair of opposing fingers 18a and 18b which in the resting position are urged apart by the spring action of the connectors which are fabricated of a spring metal such as spring steel. When the fingers 18a and 18b are manually urged together to bring tabs 18d into an overlapping relationship, and the apertures 18c of the two tabs into alignment with each other, a wire 16 can be inserted in the apertures, and when the fingers are released, such fingers hold the wire firmly in position as shown in FIG. 7A. The connectors 18 can then be selectively installed in the terminals 14 and 22 which have receptacles adapted to receive such connectors, as shown in FIG. 6. Fingers 18a of terminal 14 have curved recessed contact portions 18e which matingly engage the corresponding curved recessed finger portions 18e of terminal 22 to make good electrical contact therewith.

Referring now to FIG. 8, another form of the solderless spring connectors of the invention are illustrated. As for the previous embodiment these connectors have pairs of spring fingers 18a and 18b with apertured tabs 18d extending laterally therefrom such that when the fingers are urged towards each other, a wire 16 can be inserted in the apertures 18c and retained therein when the spring fingers are released. In this embodiment, a leaf spring 53 is attached to the end of one of tabs 18d and resiliently urges against finger 18b thereby providing extra pressure for the gripping action on the wire as well as improved contact between a pair of the connectors along their contact surfaces 57. Pairs of such connectors can be fitted into a receptacle such as shown in FIG. 6 with the fingers of nose portions 55 in abutment against each other along contact surfaces 57.

Referring now to FIG. 9, a further embodiment of the connectors of the invention is shown. This embodiment includes male and female mating connectors. The wire 16 is retained to the connector in the same manner as for the previous embodiment. Male connector 18 has an elongated nose portion 50 which fits between cantilevered spring contacts 51 formed in female connector 60.

Referring now to FIG. 10, still another embodiment of the connectors of the invention is shown. This embodiment is similar to that of FIG. 8 except that the leaf spring 53 has been eliminated and a protrusion or "bump" 63 is formed in one of spring fingers 18a, this finger portion abutting against the other finger 18b and operating to both provide improved gripping action on wire 16 and better contact between mating surfaces 57.

The apertures 18c may be diamond shaped or serrated to provide improved gripping action.

The equipment 11 is installed in a mounting frame 27 which is permanently mounted in the vehicle. Frame 27 has two separable sections 27a and 27b which are adjustably joined together by means of spring fingers 30 mounted on the opposite sides of section 27b which matingly engage a selected pair of spaced apertures 31 formed in the sides of section 27a. Fingers 30 have protrusions 30a formed thereon which can be fitted into a selected pair of apertures 31. In this manner the effective depth of the mounting frame can be adjusted to accommodate equipments having various depths by installing protrusions 30a into any one of the paired apertures as indicated, for example, by arrows "A", "B" and "C" in FIG. 3. As already noted, frame section 27b has a wire terminal 22 installed in the rear end thereof which matingly engages terminal 14 of adapter 12. Wire terminal 22 has solderless connectors 18 installed therein in the same manner as for terminal 14, these connectors receiving the various wiring connections (power, speaker leads, etc.) for the equipment.

Figure 1:
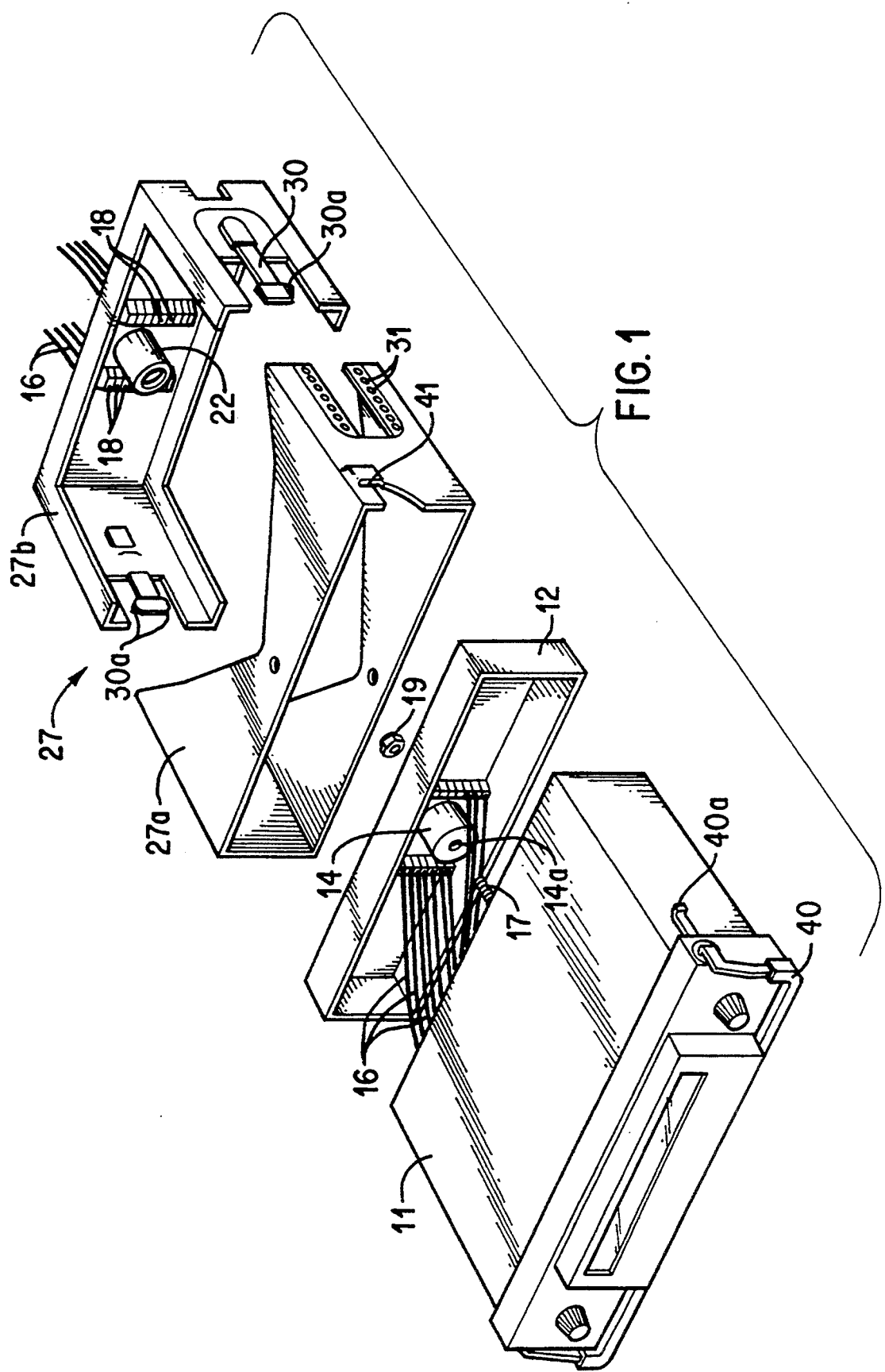
FIG. 1 is an exploded top perspective view of a preferred embodiment of the invention.
Figure 2:
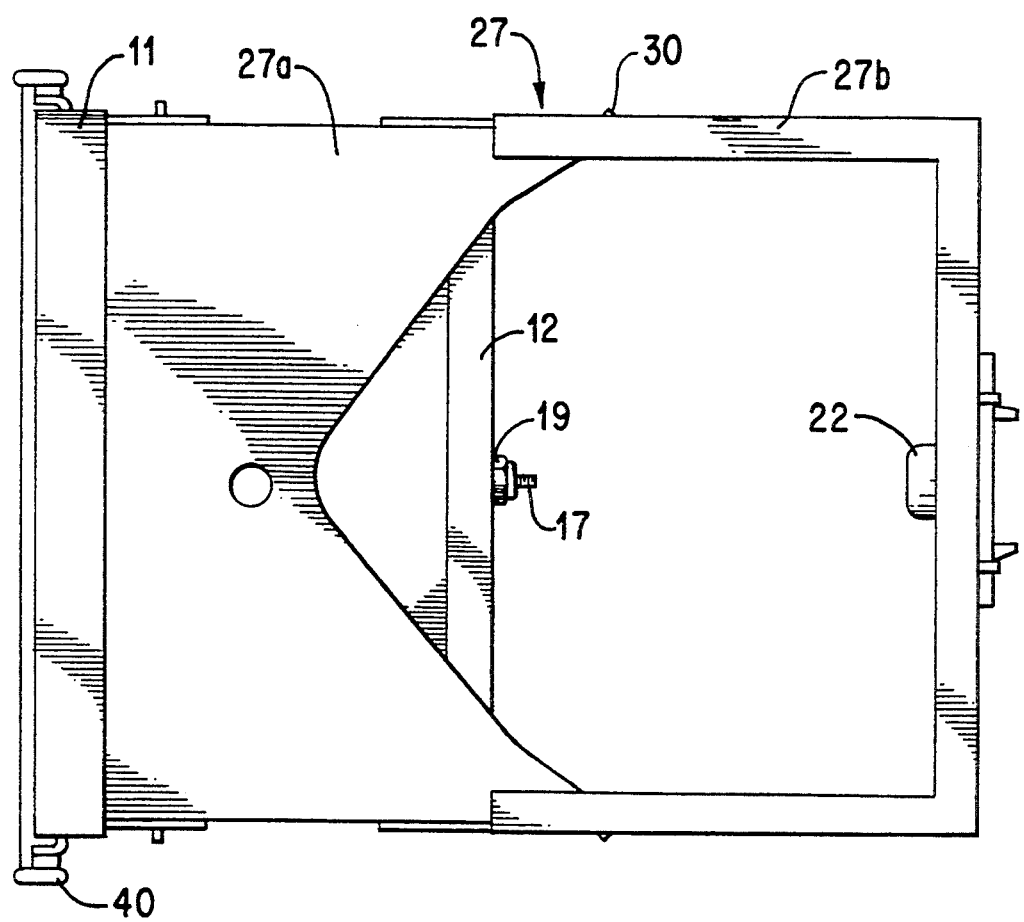
FIG. 2 is a top plan view of the preferred embodiment.
Figure 3:
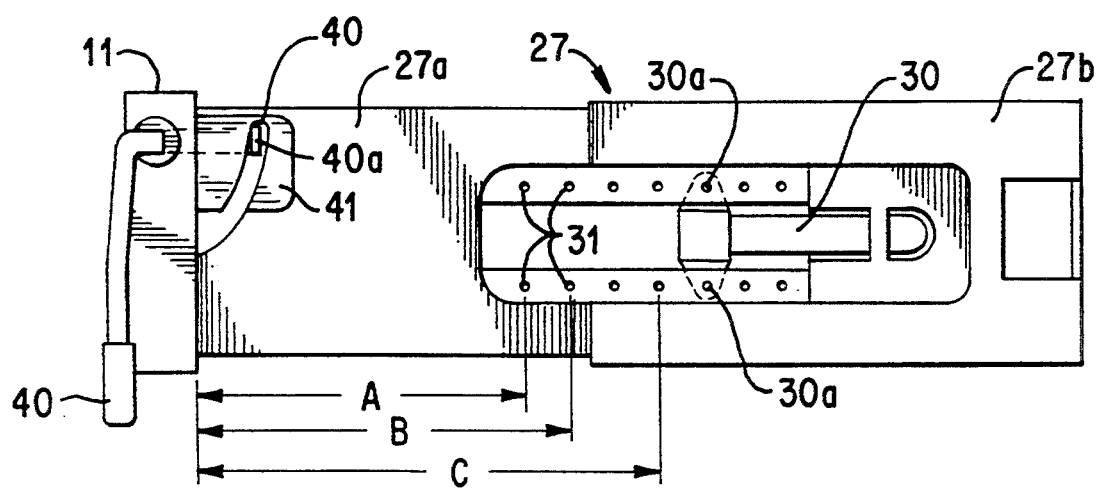
FIG. 3 is a side elevational view of the preferred embodiment.
Figure 4:
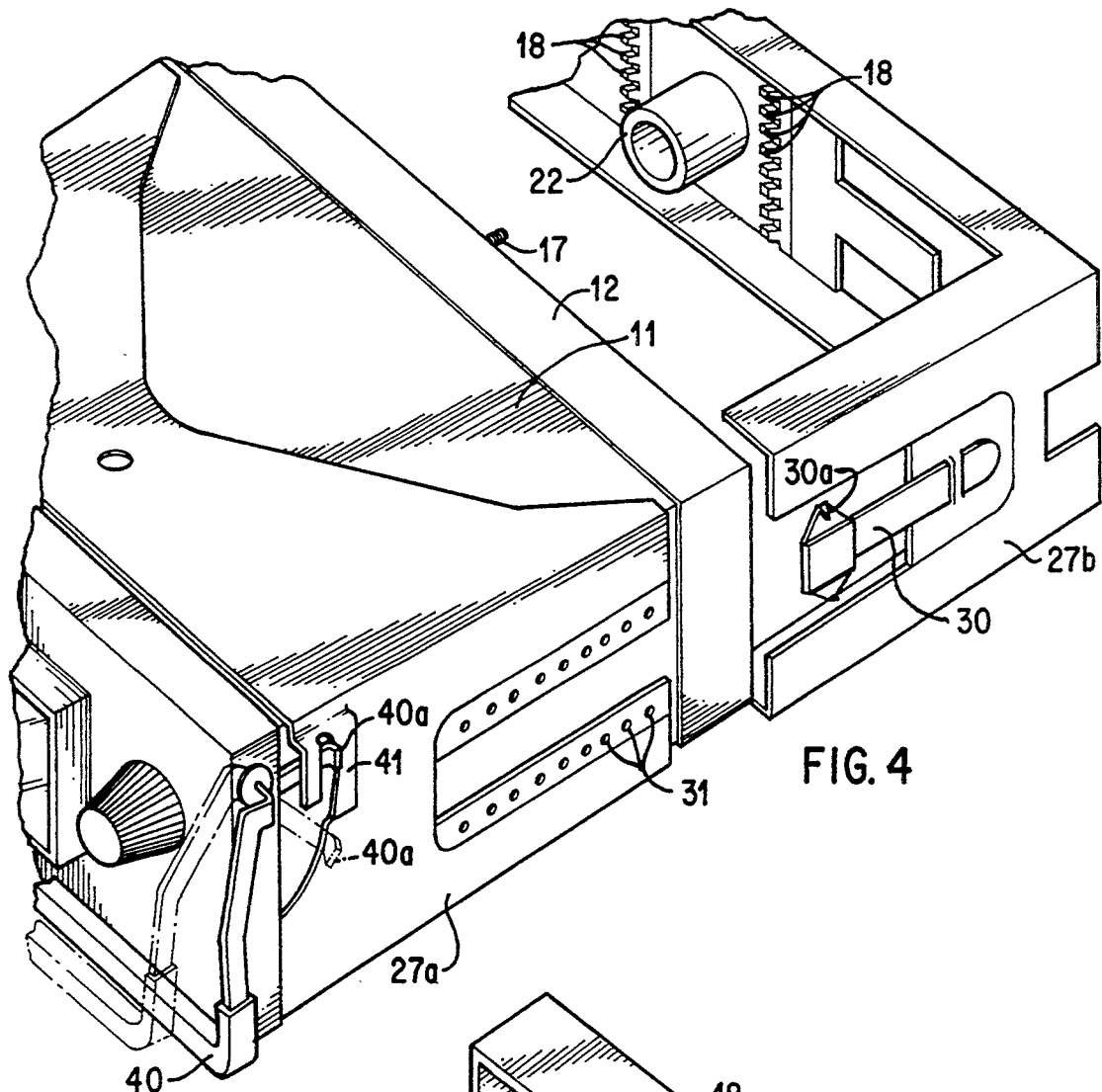
FIG. 4 is a top perspective view illustrating the interconnecting of the two sections of the mounting frame of the preferred embodiment.

Referring now to FIGS. 3 and 4 a handle 40 is pivotally mounted on the front of equipment 11. This handle has a lever 40a which extends therefrom. Lever 40a when in its down position, as shown in FIGS. 3 and 4, engages slotted latching member 41 formed on the side of section 27a of the mounting frame. When handle 40 is raised, as indicated by the dotted representation in FIG. 4, the equipment 11 can be removed from the mounting frame. With the lever in its lowered position, the equipment is retained firmly in the frame.

While the invention has been described and illustrated in detail, it is to be clearly understood that this is intended by way of illustration and example only and is not to be taken by way of limitation, the scope of the invention being limited only by the terms of the following claims:

We claim:

1. A system for removably mounting electrical equipment having wire leads thereon in a vehicle having wire leads to be connected to said equipment comprising:

a first solderless wire terminal for receiving said equipment wire leads, said terminal having a plurality of solderless spring connectors, each of said leads being installed in one of said connectors and retained thereto by the spring action of its associated connector, said first wire terminal being connected to the rear portion of said equipment, a mounting frame having separable rear and forward sections, a second solderless wire terminal being installed in the back portion of said rear frame section, said second wire terminal having solderless spring wire connectors similar to those of said first terminal, the wire connectors of said second terminal receiving the vehicle wire leads, the first and second terminals being joined together in mating engagement to provide electrical connections therebetween, and means on said rear and forward frame sections for adjusting the relative longitudinal position therebetween thereby to adjust the depth of said frame to accommodate equipments having different depths.

2. The system of claim 1 wherein the means for adjusting the relative longitudinal position between said frame sections comprises a spring finger installed on each of the side portions of one of said frame sections and a plurality of linearly spaced apertures formed on each of the side portions of the other of said frame sections, the spring fingers being adapted to engage said apertures, the effective depth of said mounting frame being adjustable by engaging said fingers with selected ones of said apertures.

3. The system of claim 1 and further including a latching slot formed in said forward mounting frame section and a lever pivotally mounted on said equipment, said lever engaging said latching slot to retain the equipment to said mounting frame.

4. A system for removably mounting electrical equipment having wire leads thereon in a vehicle having wire leads to be connected to said equipment comprising:

an adapter having a first solderless wire terminal for receiving said equipment wire leads, said terminal having a plurality of solderless spring connectors, each of said leads being installed in one of said connectors and retained thereto by the spring action of its associated connector, means for attaching said adapter to the rear portion of said equipment, a mounting frame having separable rear and forward sections, a second solderless wire terminal installed in the back portion of said rear frame section, said second wire terminal having solderless wire connectors similar to those of said first terminal, the wire connectors of said second wire terminal receiving the vehicle wire leads, the first and second terminals being joined together in mating engagement to provide electrical connections therebetween, a spring finger being installed on each of the side portions of one of said frame sections and a plurality of linearly spaced apertures being formed on each of the side portions of the other of said frame sections, the spring fingers being adapted to engage said apertures, the effective depth of said mounting frame being adjustable by engaging said fingers with selected ones of said apertures, a latching slot being formed in said forward mounting frame section, and a lever pivotally mounted on said equipment which engages said latching slot to retain the equipment to said mounting frame.

5. The system of claim 4 where each of said solderless connectors is fabricated of a spring metal and comprise a pair of opposing fingers which are urged apart by the spring action of said metal, said fingers having apertures formed therein which can be brought into alignment with each other when said fingers are urged together, whereby when one of said wires is inserted into said apertures when they are in alignment, said wire is retained to the connector by the spring action when the urging action applied to said fingers is released.

6. The system of claim 5 wherein one of the fingers of each of said connectors has a curved recessed portion which matingly engages the corresponding recessed portion of another of said connectors to make firm electrical contact therebetween.

7. The system of claim 4 wherein the spring fingers of said one of said frame sections have protrusions thereon which fit within the apertures formed in other of said frame sections.

8. A solderless spring metal connector for receiving a wire in physical retention thereto and electrical connection therewith comprising:

a pair of fingers joined together in opposing relationship, said fingers having similar tabs formed on the free ends thereof, said tabs having apertures formed therein and extending substantially normally from the main body of said fingers, said tabs being urged apart by the spring action of said connector when said fingers are not being externally urged towards each other, said tabs being capable of being manually urged together against said spring action in overlapping relationship and with said apertures in alignment with each other, one of the fingers of said connector having a curved recessed portion which is adapted to matingly engage the corresponding recessed portion of one of the fingers of another of said connectors to make firm electrical contact therebetween when said contacts are installed in a pair of wire terminals, whereby when said apertures are in alignment with each other, the wire is inserted in said apertures and retained therein when the tabs are left free to be urged apart by the spring action.

9. A solderless spring metal connector for receiving a wire in physical retention thereto and electrical connection therewith comprising a pair of fingers joined together in opposing relationship, said fingers having similar tabs formed in the free ends thereof, said tabs extending substantially normally from the main body of said fingers and having apertures formed therein, a leaf spring attached to one of said tabs, said leaf spring abutting against the finger on which the other of said tabs is formed, said tabs and said fingers being urged apart by the spring action of said leaf spring when said fingers are not being externally urged towards each other, said tabs being capable of being manually urged together against said spring action in overlapping relationship and with said apertures in alignment with each other, whereby when said apertures are in alignment with each other, the wire is inserted in said apertures and retained therein when the tabs are left free to be urged apart by the spring action.

10. A solderless spring metal connector for receiving a wire in physical retention thereto and electrical connection therewith comprising:

a pair of fingers joined together in opposing relationship, said fingers having similar tabs formed on the free ends thereof, said tabs extending substantially normally from the main body of said connector and having apertures formed therein, said tabs being urged apart by the spring action of said connector when said fingers are not being externally urged, said tabs being capable of being manually urged together against said spring action in overlapping relationship and with said apertures in alignment with each other, the end of said connector opposite to that of the free ends of said fingers having a pair of cantilevered spring contacts in opposing relationship to each other to form a resilient receptacle for receiving a male connector, whereby when said apertures are in alignment with each other, the wire is inserted in said apertures and retained therein when the tabs are left free to be urged apart by the spring action.

11. A solderless spring metal connector for receiving a wire in physical retention thereto and electrical connection therewith comprising:

a pair of fingers joined together in opposing relationship, said fingers having similar tabs formed on the free ends thereof, said tabs extending substantially normally from the main body of said fingers and having apertures formed therein, one of said fingers having a protrusion formed therein which abut against the other of said fingers, said protrusion urging said fingers apart, said tabs being urged apart by the spring action of said connector when said fingers are not being externally urged towards each other, said tabs being capable of being manually urged together against said spring action in overlapping relationship and with said apertures in alignment with each other, whereby when said apertures are in alignment with each other, the wire is inserted in said apertures and retained therein when the tabs are left free to be urged apart by the spring action.

* * * * *